(12) United States Patent
Kobayashi et al.

(10) Patent No.: US 7,660,796 B2
(45) Date of Patent: Feb. 9, 2010

(54) INFORMATION PROCESSING METHOD AND APPARATUS

(75) Inventors: Toshihiro Kobayashi, Kanagawa (JP); Toshikazu Ohshima, Kanagawa (JP); Masakazu Fujiki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 400 days.

(21) Appl. No.: 10/786,116

(22) Filed: Feb. 26, 2004

(65) Prior Publication Data

US 2004/0172448 A1 Sep. 2, 2004

(30) Foreign Application Priority Data

Feb. 28, 2003 (JP) ............................... 2003-054140

(51) Int. Cl.
*G06F 17/30* (2006.01)
(52) U.S. Cl. ............................ 707/9; 707/101; 715/234
(58) Field of Classification Search ...................... 707/1, 707/9, 8, 101; 715/234
See application file for complete search history.

(56) References Cited

U.S. PATENT DOCUMENTS

| | | | | |
|---|---|---|---|---|
| 5,285,528 | A | 2/1994 | Hart | 395/725 |
| 5,729,734 | A * | 3/1998 | Parker et al. | 707/9 |
| 5,933,825 | A * | 8/1999 | McClaughry et al. | 707/8 |
| 6,151,028 | A | 11/2000 | Kumagai et al. | 345/527 |
| 6,215,495 | B1 * | 4/2001 | Grantham et al. | 345/419 |
| 6,529,905 | B1 * | 3/2003 | Bray et al. | 707/8 |
| 7,062,532 | B1 * | 6/2006 | Sweat et al. | 709/205 |
| 7,249,314 | B2 * | 7/2007 | Walker et al. | 715/205 |

FOREIGN PATENT DOCUMENTS

| | | |
|---|---|---|
| JP | 4-319734 | 11/1992 |
| JP | 10-255069 | 9/1998 |
| JP | 11-85597 | 3/1999 |
| JP | 2002-504244 | 2/2002 |
| JP | 2002-123813 | 4/2002 |
| WO | WO 96/15501 | 5/1996 |

OTHER PUBLICATIONS

G. Heshina et al., "Distributed Open Inventor: A Practical Approach to Distributed 3D Graphics", in Proc. of the ACM Symposium on Virtual Reality Software and Technology (VRST'99), pp. 74-81, 1999.

* cited by examiner

*Primary Examiner*—Shahid A Alam
*Assistant Examiner*—Kimberly Lovel
(74) *Attorney, Agent, or Firm*—Fitzpatrick, Cella, Harper & Scinto

(57) ABSTRACT

There is provided an information processing method for setting the exclusive control right of a data item by a specific process in a system in which a plurality of clients connected via a network share data including a plurality of data items. In this method, when a desired data item is designated so as to set its exclusive control right, data items which belong to layers lower than the designated data and are related to the designated data item are retrieved on the basis of the hierarchical structure information of the plurality of data items. Then, the exclusive control right is set for the designated data item and retrieved data items.

4 Claims, 23 Drawing Sheets

F I G. 14
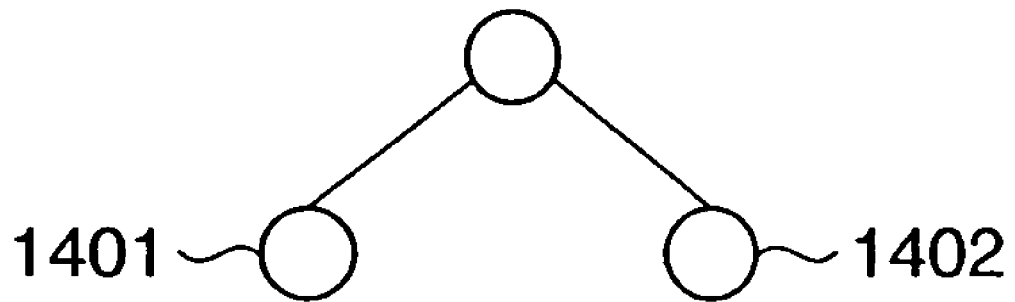

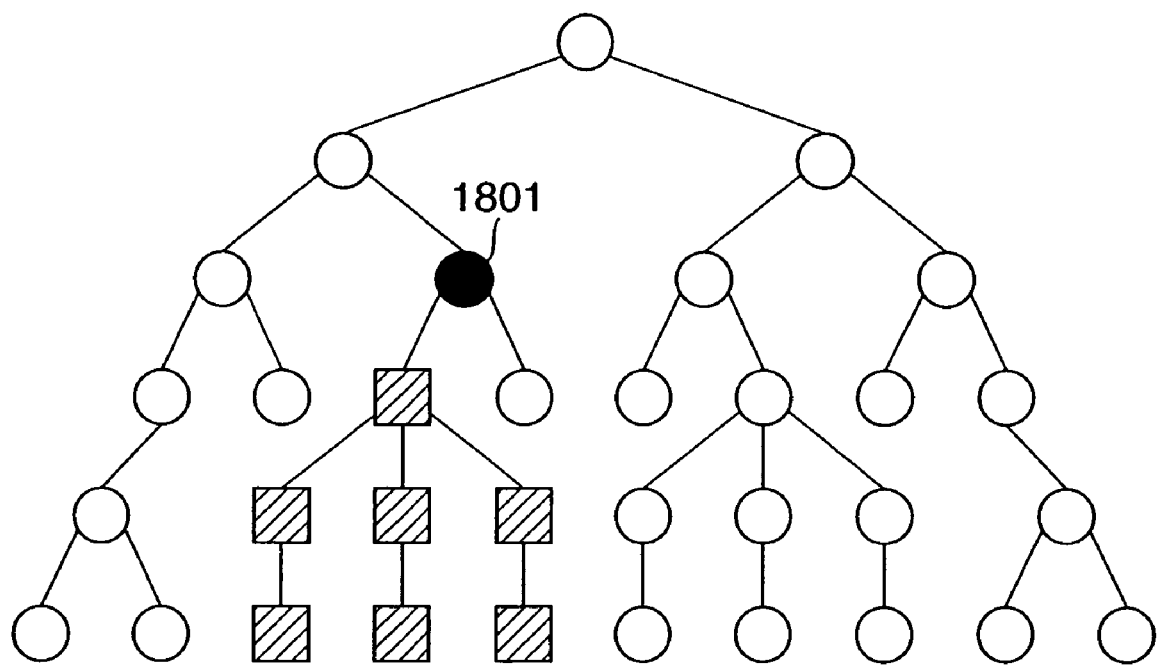
F I G. 18

INFORMATION PROCESSING METHOD AND APPARATUS

FIELD OF THE INVENTION

The present invention relates to a technique for sharing and manipulating data among a plurality of processes and, more particularly, to a technique suited to exclusive control upon sharing a database, which holds data that describes objects in a three-dimensional virtual space, among a plurality of processes via a network.

BACKGROUND OF THE INVENTION

A technique for sharing a three-dimensional (3D) virtual space among different computer terminals is indispensable to implement remote meeting systems, network games, cooperative design systems, and the like.

In such system that shares a 3D virtual space each terminal uses virtual space data so as to draw moving images on the virtual space by computer graphics. In order to manage such virtual space data, the following methods are known. In one method, a server has virtual space data, and respective terminals generate CG images by referring to the virtual space data on the server via a network. In another method, respective terminals have copies of the virtual space data and generate CG images by referring to them. When the respective terminals have copies of virtual space data, and when an arbitrary manipulation (e.g., movement or rotation of a virtual object) has been made for the virtual space on a given terminal, information associated with that manipulation is transmitted to other terminals via the network, thus reflecting that information on the databases of the respective terminals. As a result, consistency among the databases of the respective computer terminals is maintained.

As an implementation example of such virtual space sharing system, Distributed Open Inventor (source: G. Heshina et. al.: "Distributed Open Inventor: A Practical Approach to Distributed 3D Graphics", in Proc. of the ACM Symposium on Virtual Reality Software and Technology (VRST'99), pp. 74-81, 1999) is known.

However, with either method, when identical virtual space data is manipulated from respective terminals at the same time or at temporally very close timings, an unintended result may be generated or consistency of virtual space data may no longer be maintained.

As a method of coping with such problem, a concept called an exclusive control right is known. With this concept, a terminal, which wants to manipulate a given manipulation object, acquires the right (exclusive control right) to exclusively manipulate that manipulation object, and then starts manipulation. A manipulation object, which is set with the exclusive control right, is never manipulated by a terminal other than the terminal that has acquired the exclusive control right. That is, since it is guaranteed that one and only terminal can manipulate that manipulation object at a given time, the aforementioned problem can be solved.

In general, objects laid out on a 3D space have a hierarchical cross-relationship. When a manipulation for, e.g., moving a given object is made, that manipulation has an influence on all objects that belong to the manipulated object. For example, when an object is placed on another object, if the lower object has been moved, the upper object normally changes its position accordingly. In order to appropriately express such hierarchical cross-relationship between objects, it is a common practice to describe virtual space data using a tree structure such as an N-ary tree or the like, or a data structure such as a nonrecursive directed graph or the like.

However, in the conventional system, the exclusive control right is set for individual objects irrespective of the hierarchical relationship on the virtual space. For this reason, in order to manipulate a given object, the user must recognize beforehand the hierarchical relationship on the virtual space to which objects belong, and must then individually acquire the exclusive control rights for other objects which relate to that object, resulting in very troublesome operations. Hence, an improvement is demanded.

SUMMARY OF THE INVENTION

The present invention has been made in consideration of the above problems, and has as its object to provide an exclusive control right acquisition method based on the hierarchical structure of a virtual space, thus allowing a manipulator to appropriately acquire the required exclusive control right regardless of the structure of the virtual space.

According to one aspect of the present invention, there is provided an information processing method for setting an exclusive control right of a data item by a specific process in a system in which a plurality of processes that can communicate with each other via an information transmission medium share data including a plurality of data items, comprising: a first designation step of designating a desired data item for which the exclusive control right is to be set; a retrieval step of retrieving a data item which belongs to a lower layer with respect to the data item designated in the first designation step on the basis of hierarchical structure information of the plurality of data items; and a setting step of setting the exclusive control right by the specific process to the designated data item and the data item retrieved in the retrieval step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 14 shows an example wherein exclusive control rights are independently set for respective manipulation objects;

FIG. 18 shows an example wherein the exclusive control right of a sub-scene graph cannot be acquired;

DETAILED DESCRIPTION OF THE PREFERRED EMBODIMENTS

Preferred embodiments of the present invention will now be described in detail in accordance with the accompanying drawings.

First Embodiment

The first embodiment will explain an implementation example in which an information processing method according to the present invention is applied to a virtual space sharing system that allows a plurality of terminals to share scene databases which describe the structure and properties of a virtual space.

Figure 1:
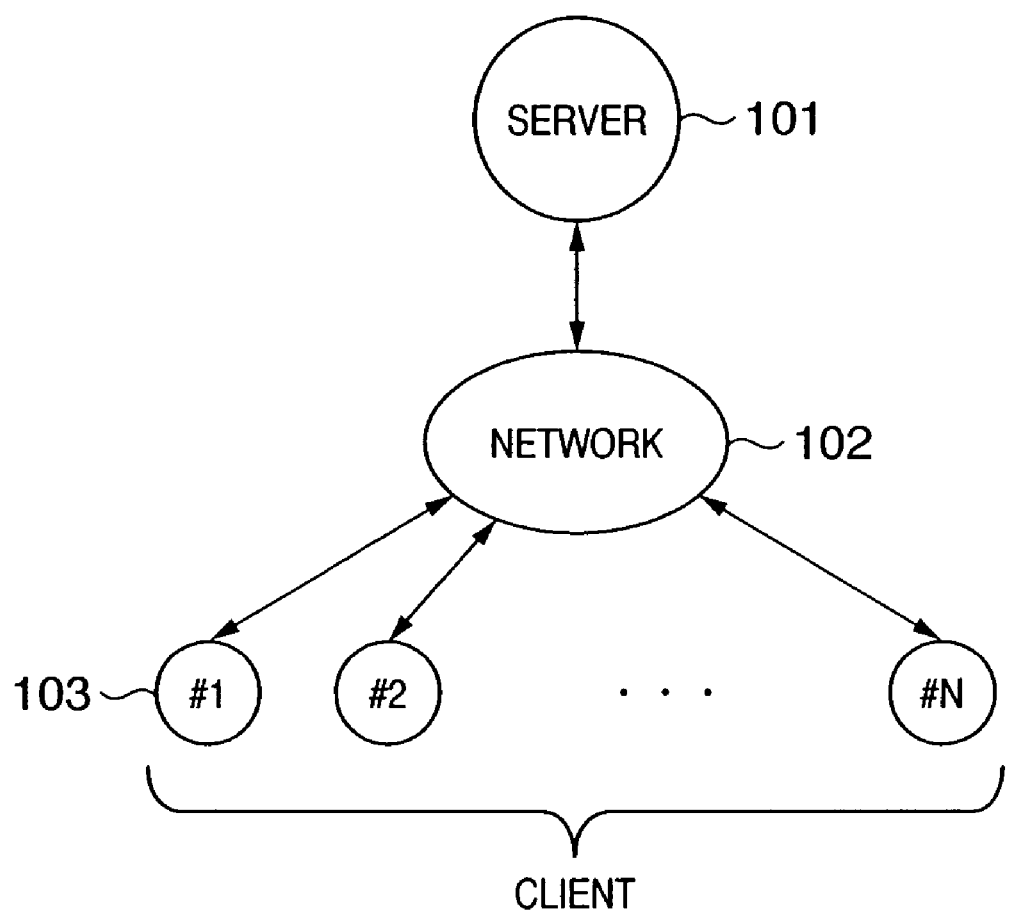
FIG. 1 is a block diagram showing the overall arrangement of a database sharing system according to the first embodiment.

FIG. 1 shows the overall arrangement of the virtual space sharing system of this embodiment. The system includes one server process 101 (to be simply referred to as "server" hereinafter), and a plurality of client processes 103 (to be simply referred to as "clients" hereinafter), which exchange data via a network 102 as an information transmission medium. Each client holds a scene database which describes the structure and properties of a common virtual space. In this embodiment, the network 102 is a LAN built on the Ethernet®. Also, in the following description, the server and clients may be generally called "host". Note that either a wireless or wired information transmission medium may be used.

The term "database manipulation" used in the following description will be explained. A "manipulation" of a database indicates a procedure for rewriting the contents of a database in an arbitrary process having a shared database. The database manipulation is classified into two processes, i.e., "manipulation command" and "manipulation execution". The manipulation command is an update request of the database, and does not actually rewrite the contents. The actual rewrite process of the database is executed in the manipulation execution process. Hence, "manipulation" will indicate "database manipulation" herein unless otherwise specified. If a manipulation object is other than a database, the manipulation object is specified like "interactive device manipulation by the user".

Note that the manipulation command may be generated by the user or by a process during an operation. As the former example, the manipulation command is generated when the user has moved a virtual object by manipulating an interactive device such as a mouse or the like. On the other hand, as the latter example, the manipulation command is generated when, e.g., a game program has algorithmically moved/rotated an enemy character in a shooting game system.

Figure 2:
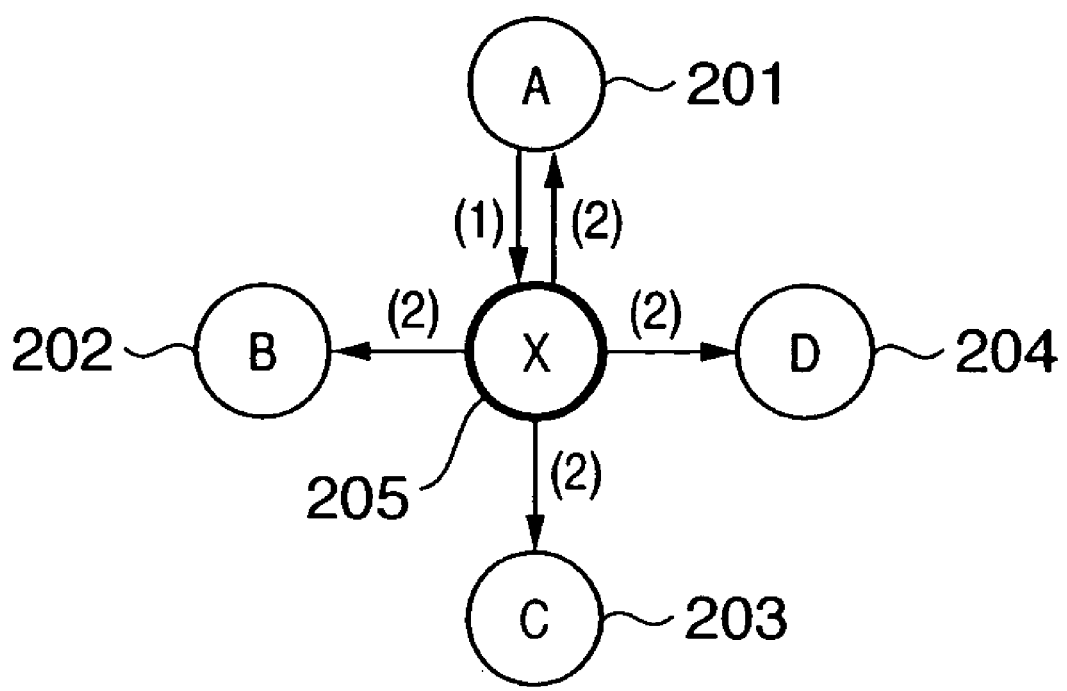
FIG. 2 shows a basic information transmission method among processes according to the first embodiment.

FIG. 2 shows the basic information flow upon updating databases. In FIG. 2, reference symbols A, B, C, and D (201 to 204) denote clients; and X (205), a server. Assume that client A (201) has generated a manipulation command of a scene database. The contents of the manipulation command are transmitted to the server via a network (a process indicated by arrow (1) in FIG. 2). Upon reception of this manipulation command, the server distributes data transmitted from client A (201) to all clients (a process indicated by arrow (2) in FIG. 2). Through these processes, non-manipulator clients B (202), C (203), and D (204) can also detect the manipulation contents.

Figure 3:
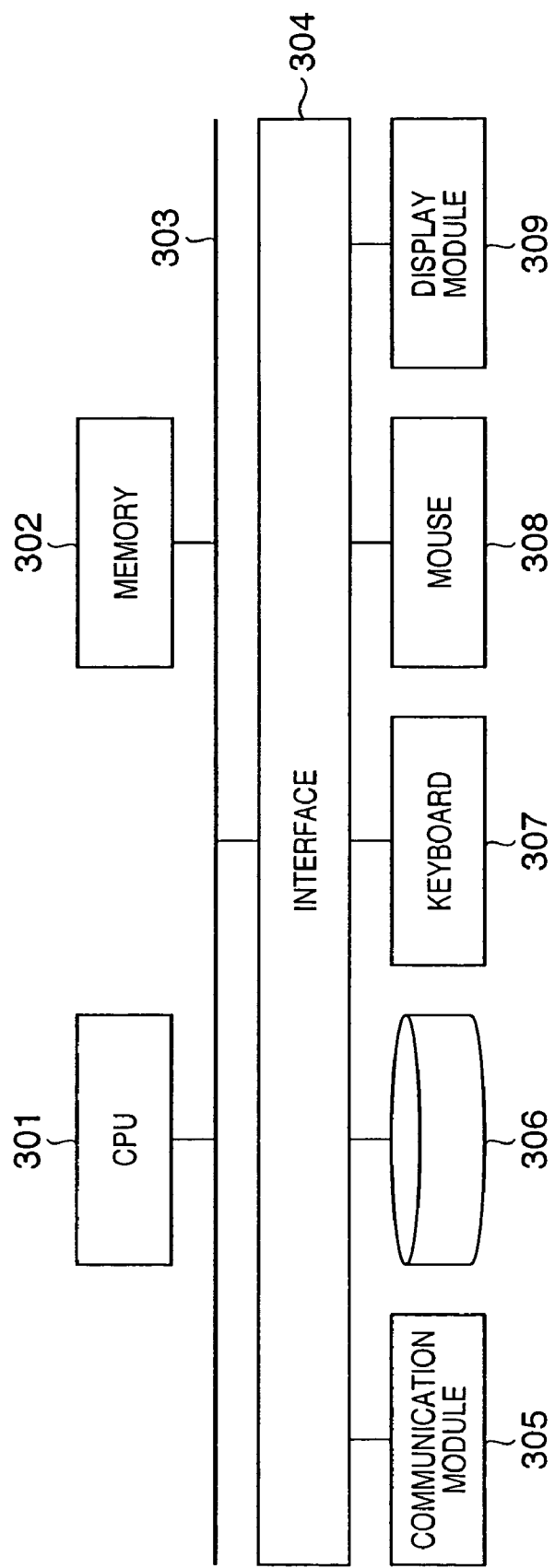
FIG. 3 is a block diagram showing the hardware arrangement of a terminal device according to the first embodiment.

FIG. 3 shows the arrangement of a terminal on which the client or server process runs. Referring to FIG. 3, reference numeral 301 denotes a CPU which controls the operation of the overall terminal. Reference numeral 302 denotes a memory which stores programs and data used in operations of the CPU 301. Reference numeral 303 denotes a bus which transfers data among respective building modules. Reference numeral 304 denotes an interface between the bus 303 and respective devices. Reference numeral 305 denotes a communication module which is used to establish connection to the network; 306, an external storage device which stores programs and data to be loaded by the CPU 301; 307 and 308, a keyboard and mouse, which form an input device used to launch each program and to designate operations of that program; and 309, a display module which displays the operation result of the process.

Figure 4:
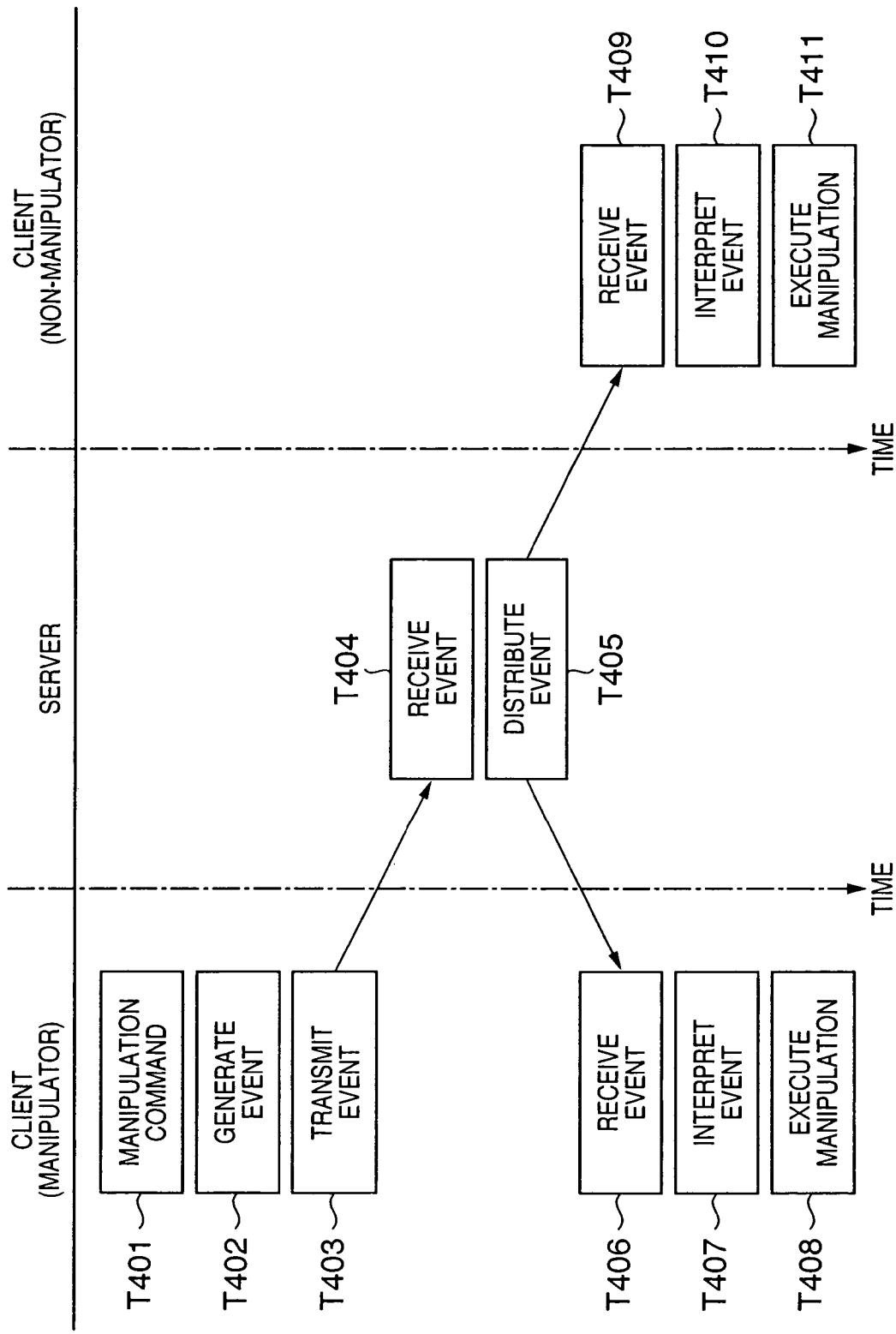
FIG. 4 is a chart showing the database update sequence according to the first embodiment.

The system of this embodiment synchronizes the update timings of the databases of the respective clients by executing a manipulation corresponding to a given manipulation command after reception of an event distributed from the server. FIG. 4 illustrates the processing sequence along with an elapse of time. In FIG. 4, "manipulator" indicates a client that has generated the manipulation command, and "non-manipulator" indicates a client other than the manipulator. The processes progress as follows.

In procedure T401, the manipulator client issues a manipulation command of a database. At this time, the database of the manipulator client is not updated. An event that indicates the manipulation contents in procedure T401 is generated in procedure T402, and is transmitted to the server in procedure T403. The server receives that event in procedure T404, and transmits the event to all clients which have established connection to the server in procedure T405 (establishment of connection will be explained later in step S702 in FIG. 7). The manipulator client receives the event issued by the server in procedure T406, interprets the contents of the event (T407), and rewrites the database (manipulation execution: T408). The same procedures from reception of the event until manipulation execution apply to each non-manipulator client (procedures T409 to T411). As shown in FIG. 4, in the database manipulation of this embodiment, a time lag is generated from the manipulation command (T401) until the manipulation execution (T408). However, if information is transferred on the network under the same condition, it is expected that both manipulator and non-manipulator clients update their databases at nearly the same time, and images on the virtual space are synchronized among the clients.

Figure 5:
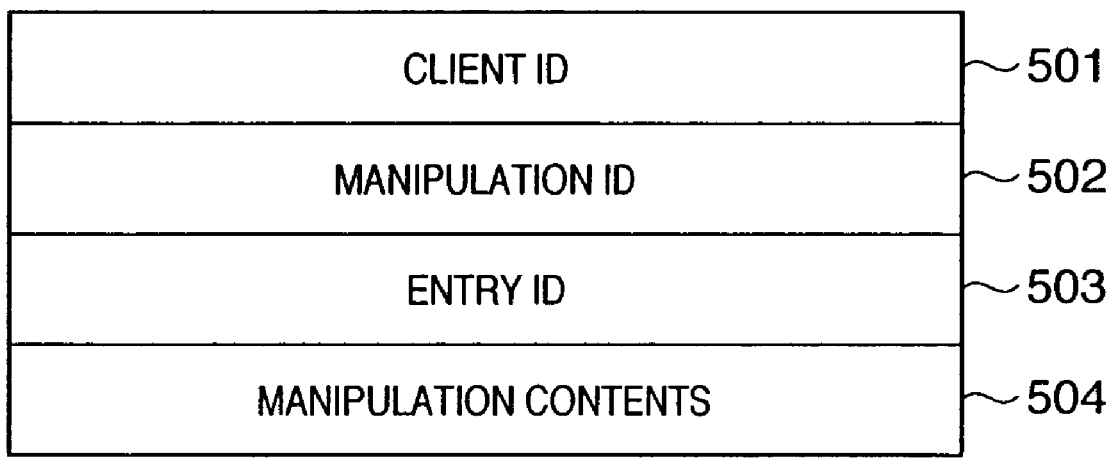
FIG. 5 shows an example of the data configuration of event data.

FIG. 5 shows the configuration of an event issued from the client to the server, or from the server to the client. Event data is made up of a plurality of fields. A client ID field 501 stores a number which is used to uniquely identify each client and is assigned by the server when the client establishes network connection to the server (to be described later in step S702 in FIG. 7). A manipulation ID field 502 stores a number which is used to uniquely identify a manipulation, and is assigned when a manipulation command is issued at each client. Using the pair of data in the client ID field 501 and manipulation ID field 502, all manipulation commands that have been issued in the system can be uniquely specified.

An entry ID field 503 stores a number which is used to uniquely identify each entry of the database, and is assigned upon loading data from a file. A manipulation content field 504 stores the detailed contents of a manipulation command. For example, when a manipulation for setting the X-coordinate of a CG object to a given value is made, this field stores a set of a number that identifies an X-coordinate property, and an X-coordinate setting value.

Figure 6:
FIG. 6 shows an example of the data configuration of a manipulation queue.

At the time of reception of a given manipulation event, if a manipulation corresponding to another manipulation event which was issued previously is in progress, the manipulation command received later is held in a manipulation queue, and is executed in turn after the previous manipulation execution is completed. FIG. 6 shows the manipulation queue. The manipulation queue is a list of manipulation commands which wait for reception of events or execution processes. If there are m manipulation commands in the waiting state at an arbitrary time, the manipulation queue is formed by listing up m pieces of information (queue items) associated with manipulation commands in the order the commands are generated, as shown in FIG. 6.

The flows of the database manipulation processes of the client and server will be described in detail below.

Figure 7:
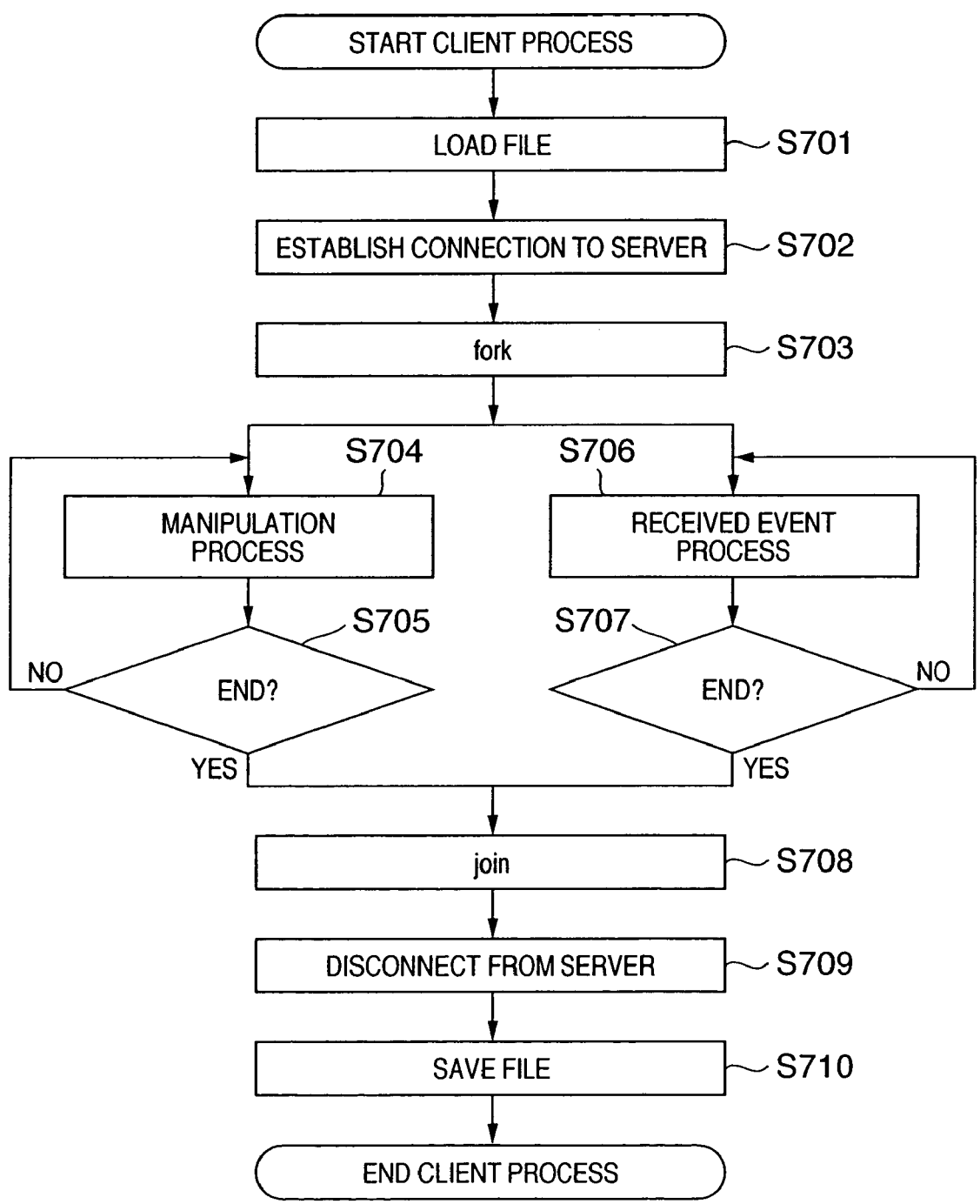
FIG. 7 is a flow chart showing a client process according to the first embodiment.

FIG. 7 is a flowchart that shows the overall flow of the database manipulation in the client process. When the client is started up, it loads a file that describes the virtual space from the external storage device 306 (FIG. 3) in step S701 to build a scene graph database on the memory 302 (FIG. 3). In order to maintain data consistency among clients, the files to be loaded have the same contents among clients. The client establishes network connection to the server (step S702). At this time, the server assigns a client ID 501 (FIG. 5) which is used to identify each client. Note that data exchange between the client and server is attained by a one-to-one socket communication using the TCP/IP protocol. Therefore, the server has socket communication paths as many as at least the number of clients.

In step S703, the process forks to launch a manipulation process (step S704) for processing a manipulation command, and a received event process (step S706) for processing an event received from the server. Note that a process for generating a CG image of the virtual space with reference to the scene graph database is also launched (not shown in FIG. 7). Since this process is the same as the known CG image generation method, a detailed description thereof will be omitted. The manipulation process and received event process will be described in detail later.

In each of the manipulation process and received event process, it is checked in step S705 or S707 if a process end instruction is detected. If NO in step S705 or S707, the flow returns to step S704 or S706 to continuously process the manipulation command or received event. On the other hand, if YES in step S705 or S707, the processes are joined in step S708. After network connection to the server is disconnected (step S709), the contents of the database are saved as a file in the external storage device 306 (FIG. 3) (step S710), thus ending all processes.

Figure 8:
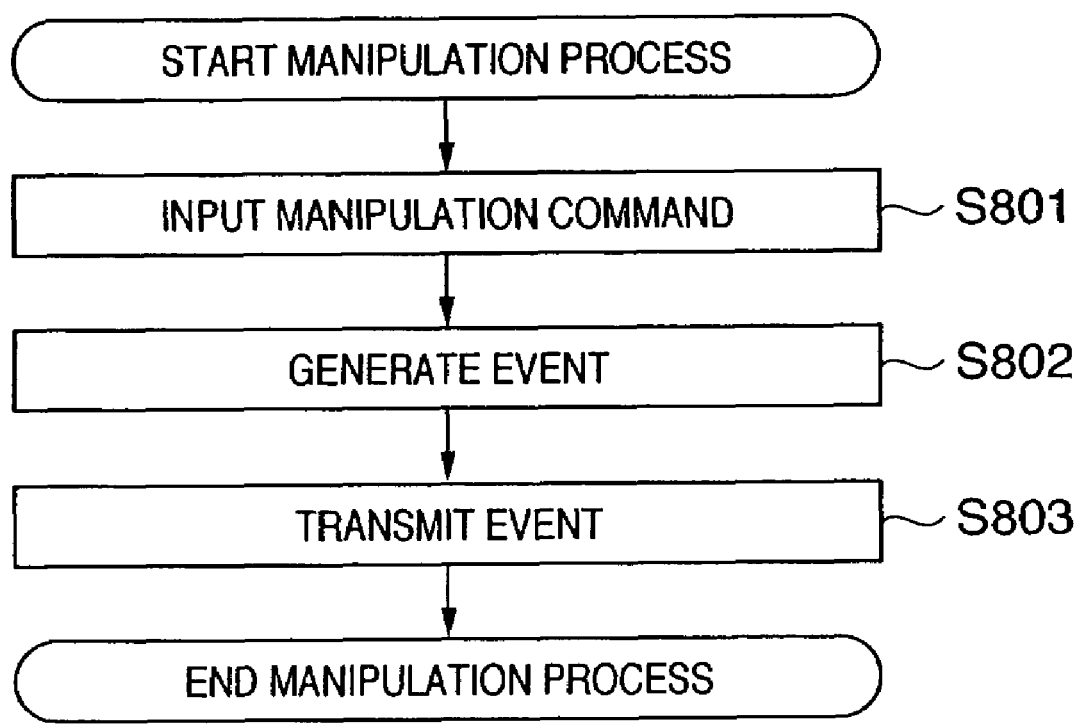
FIG. 8 is a flow chart showing a manipulation process in the client process shown in FIG. 7.

The manipulation process in step S704 will be described in detail below with reference to FIG. 8. Initially, the contents of a manipulation command are input in step S801 (T401). At this time, a manipulation ID 502 (FIG. 5) that uniquely specifies the manipulation command is determined. In step S802, event data (see FIG. 5) is generated on the basis of the manipulation contents input in step S801 (T402). The flow then advances to step S803 to transmit the generated event data to the server (T403).

Figure 9:
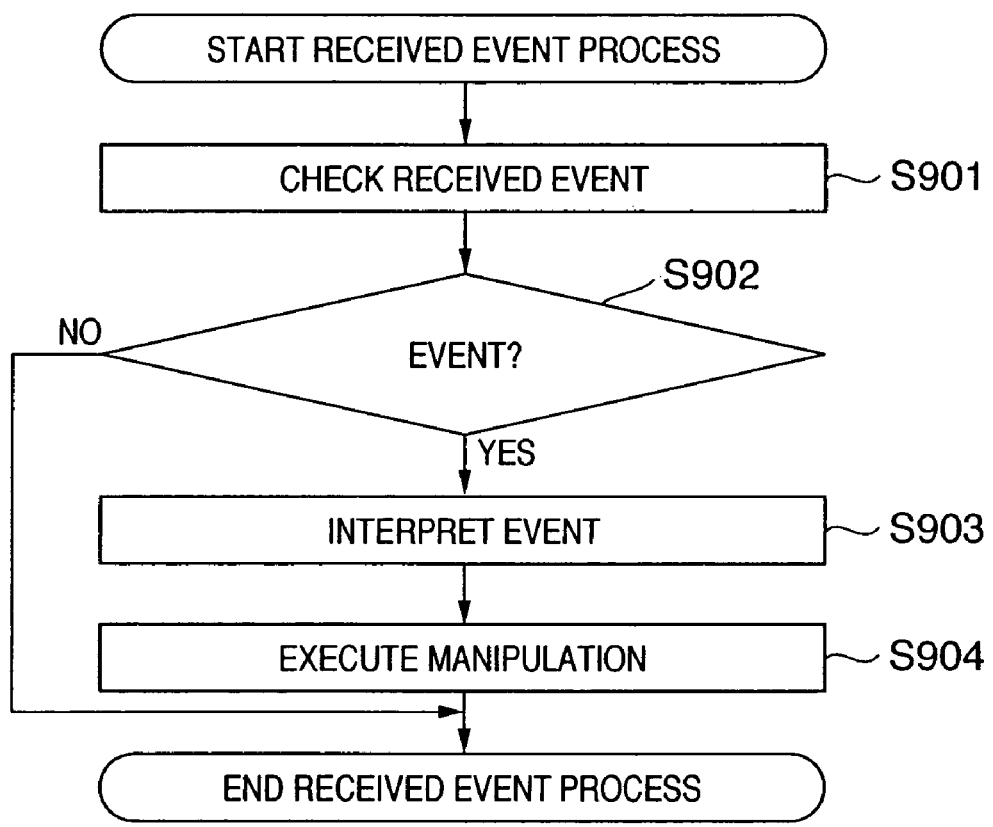
FIG. 9 is a flow chart showing a received event process in the client process shown in FIG. 7.

The received event process in step S706 (FIG. 7) will be described in detail below. FIG. 9 shows the flow of the received event process. The received event is received from the server by the communication module 305 and is input to a received event buffer.

In step S901, the received event buffer is searched. It is checked in step S902 if an event is input to the received event buffer. If a received event is found, the flow advances to step S903. On the other hand, if it is determined that no received event is present, the process ends. If a received event is found, that event data is interpreted to extract the contents of a manipulation command (step S903; T406, T407, T409, T410). In step S904, a manipulation described in the event is executed (T408, T411). More specifically, the setting value of an entry designated by the entry ID 503 is changed according to the manipulation contents 504.

Figure 10:
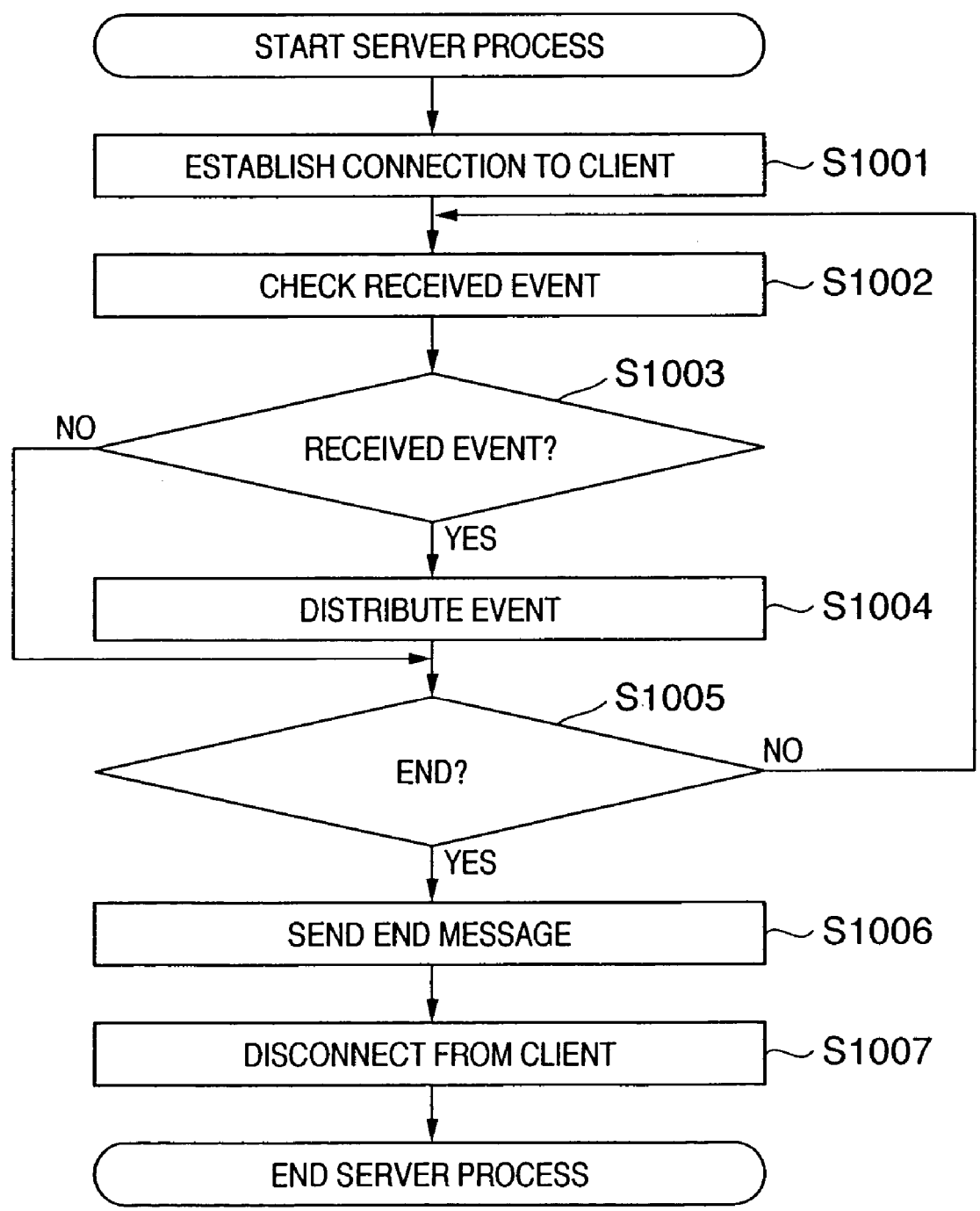
FIG. 10 is a flow chart for explaining a server process according to the first embodiment.

The flow of the client-side process has been explained. The flow of the server-side process will be described in detail below using FIG. 10.

In step S1001, the server accepts connection requests from clients to establish a communication. At this time, the server notifies the clients, with which the communication has been established, of client IDs 501. The server then searches the received event buffer (step S1002) to check if a received event is present (step S1003). If a received event is found, the flow advances to step S1004; otherwise, the flow jumps to step S1005. In step S1004, the server transmits the event to the connected clients (T404, T405). It is checked in step S1005 if the server process is to end in response to a user's command. If the server process is to end, the flow advances to step S1006; otherwise, the flow returns to step S1002. In step S1006, the server notifies the connected clients that the process is to end, and disconnects connection to the clients (step S1007), thus ending the process.

The configuration of the database description file to be loaded by the client in this embodiment will be described below.

Figure 11:
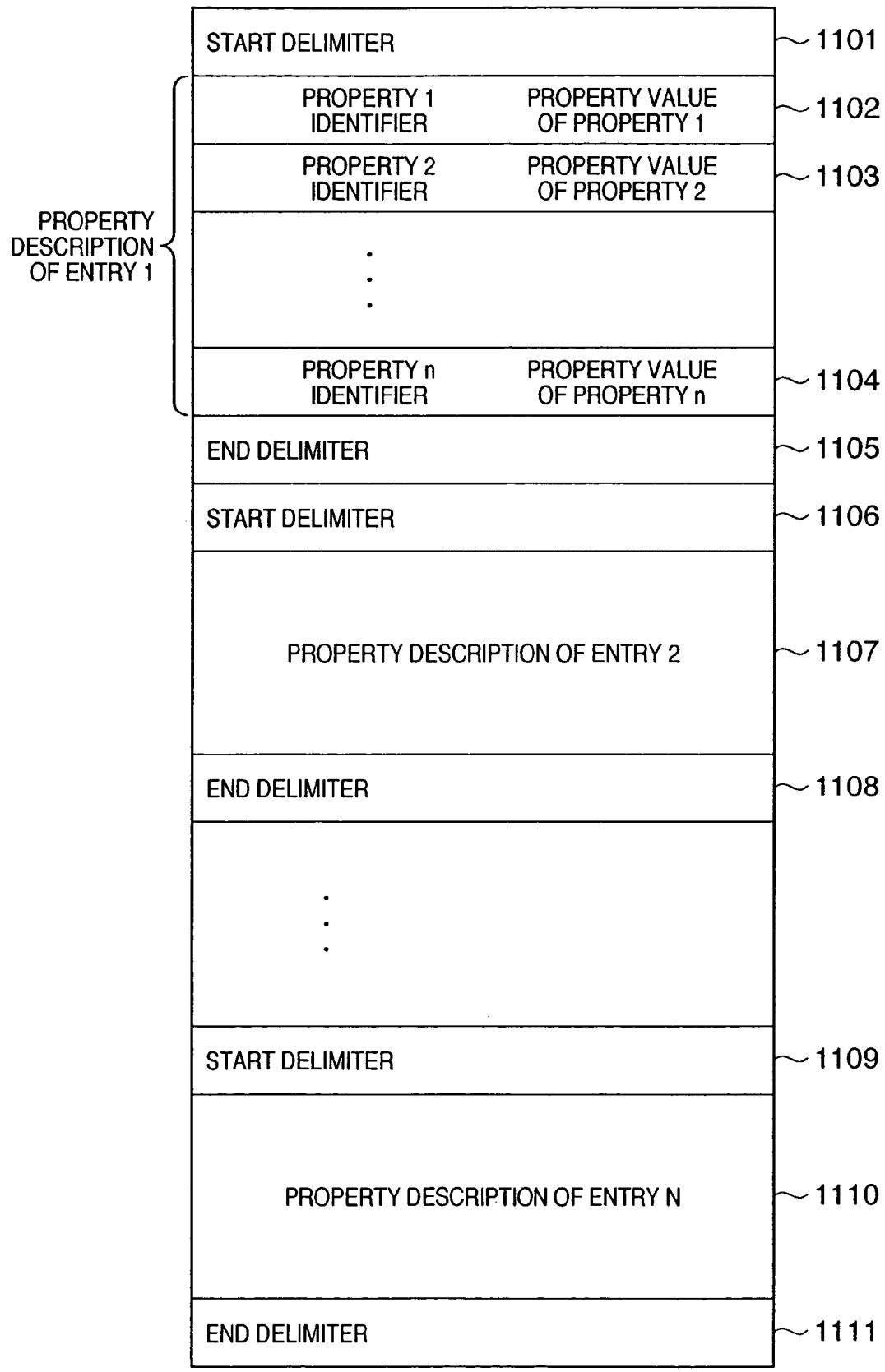
FIG. 11 shows the description file format of a database.

FIG. 11 shows the file format of data with N entries. The properties of each entry are described in fields bounded by start and end delimiters. In FIG. 11, the start delimiters of the first, second 1107, and N-th 1110 entries are respectively denoted by 1101, 1106, and 1109. On the other hand, the end delimiters of these entries are 1105, 1108, and 1111. Each property of an entry is described as a pair of an identifier used to identify that property, and an attribute value, as indicated by 1102 to 1104 in the case of the first entry.

In the above description, a data communication between the server and client is attained by a one-to-one TCP/IP socket communication. Alternatively, events may be exchanged by broadcast or multicast. The communication protocol is not limited to TCP/IP. The Ethernet® is used as the communication medium. Alternatively, other information transmission media such as USB, Firewire, and the like may be used.

Furthermore, the network is not limited to the LAN, and connections via a WAN may be adopted or both the LAN and WAN may be used in combination.

The number of servers is not limited to one per shared database system, and a plurality of servers may be connected. In this case, processes may be arbitrarily assigned to respective servers. For example, different servers may be used for respective clients, and servers may be prepared in correspondence with respective database entries.

Furthermore, the number of processes to be assigned to each terminal is not limited to one process per terminal, but a plurality of processes can run on one terminal. In this case, arbitrary types of processes may be combined, and the system operates in all combinations of only client processes, only server processes, and client and server processes. Note that processes which run on a single terminal may exchange data via a shared memory in place of the network.

Events are distributed to respective terminals via the server. Alternatively, a terminal on which the data manipulation has been made may directly transmit an event to other terminals.

In a system in which each of a plurality of processes connected via an information transmission medium to be able to communicate with each other holds and uses shared data to be shared by these processes, a server process establishes connection to a plurality of client processes, and receives events associated with changes of shared data from these client processes. In this manner, consistency of shared data held by the respective processes is maintained. The server process then issues each received event to the plurality of client processes.

The structure of a scene database that expresses a virtual space in the system of this embodiment will be described below.

Figure 12:
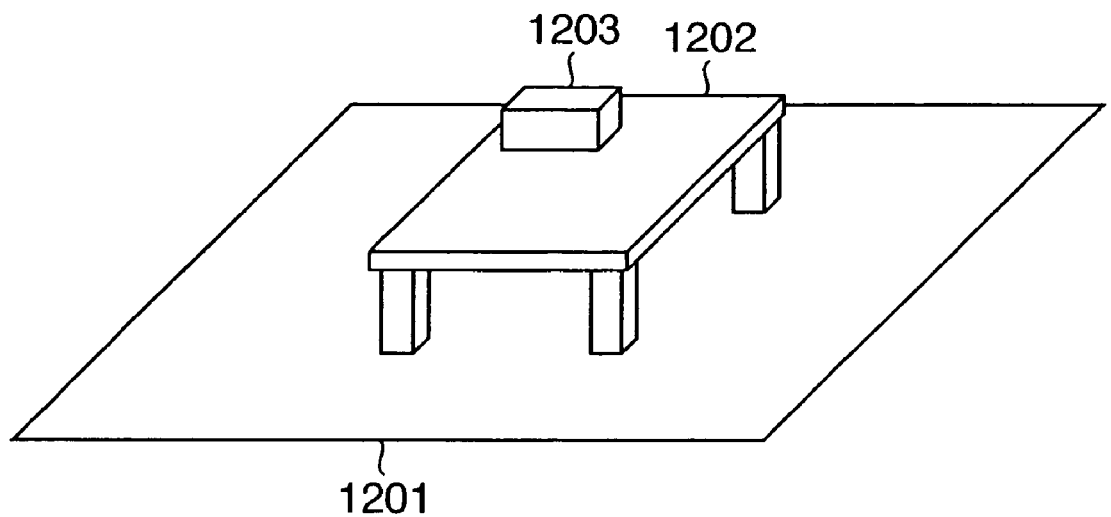
FIG. 12 is a perspective view showing an example of the structure of a virtual space.
Figure 13:
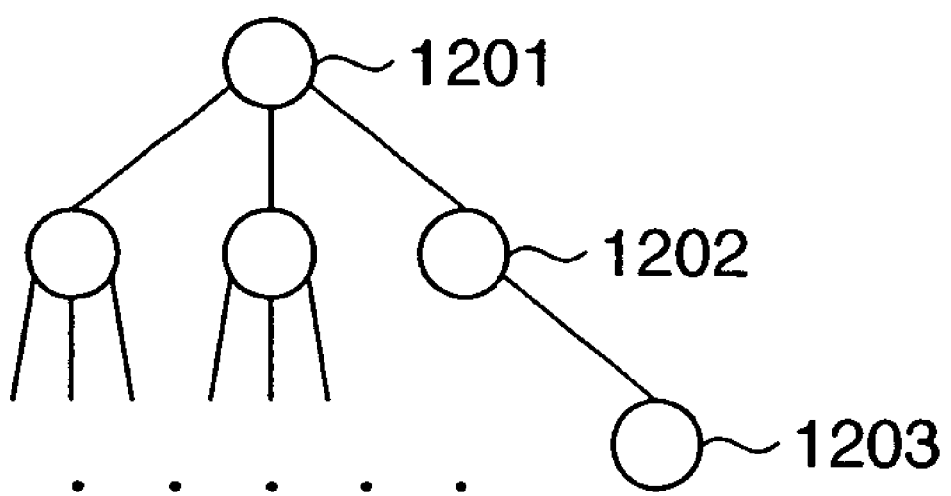
FIG. 13 shows an example of a scene graph that expresses the virtual space shown in FIG. 12.

A scene database in the system of this embodiment adopts a tree structure or nonrecursive directed graph structure called a "scene graph". The scene graph is a data structure used to describe a structural dependence of the virtual space. FIG. 12 exemplifies a virtual space on which a table 1202 is placed on a floor 1201, and a box 1203 is placed on the table 1202. FIG. 13 shows an example of the scene graph that expresses the virtual space of FIG. 12. In FIG. 13, circles mean nodes of the tree structure, and lines mean branches. In the accompanying drawings, nodes of a scene graph are expressed by circles, and branches are expressed by lines unless otherwise specified. Note that each node represents a data item to be manipulated.

In the scene graph in FIG. 13, the floor 1201 is set at the root of the tree structure, the table 1202 is set as a child of the floor 1201, and the box 1203 is set as a child of the table 1202. With this data structure, when the floor 1201 is moved on the virtual space, the table 1202 and box 1203 can also be moved to follow the floor 1201 as if the table 1202 were placed on the floor 1201 and the box 1203 were placed on the table 1202 in practice.

In the system of this embodiment, when a plurality of clients simultaneously issue manipulation commands to a given manipulation object in the database, a result that the manipulator did not intend may be generated. For example, a case will be examined below wherein clients 1 and 2 and server (none of them are shown) share a database, clients 1 and 2 respectively issue manipulation command A for translating manipulation object T (not shown) by 1 in the positive direction of the X-axis, and manipulation command B for translating manipulation object T by 1 in the negative direction of the X-axis at nearly the same time. The server receives manipulation commands A and B from clients 1 and 2, and executes manipulations for manipulation object T in the order in which manipulation commands arrived the server. If the server executes manipulations in the order of manipulation command A and manipulation command B, manipulation object T translates by 1 in the positive direction of the X-axis by manipulation command A, and then translates by 1 in the negative direction of the X-axis by manipulation command B. As a result, upon completion of manipulation command B, manipulation object T has a state equal to that immediately before manipulation command A was executed. Likewise, when the server executes manipulations in the order of manipulation command B and manipulation command A, manipulation object T has a state equal to that immediately before manipulation command B was executed upon completion of manipulation command A. Since manipulation commands A and B are executed within a very short period of time, manipulation object T is observed by each client or the server as if it stood still or oscillated. In this case, client 1 wanted to translate manipulation object T by 1 in the positive direction of the X-axis by manipulation command A, and client 2 wanted to translate manipulation object T by 1 in the negative direction of the X-axis by manipulation command B. Therefore, an actual manipulation result is against the intentions of both clients 1 and 2.

In order to avoid the aforementioned problem, a host which wants to manipulate a given manipulation object acquires the right to exclusively manipulate that manipulation object in advance, and then issues a manipulation command of the manipulation object. This right is called "exclusive control right". For a manipulation object set with the exclusive control right, a manipulation command from a host other than that which has acquired the exclusive control right is not executed, and only the host which has acquired the exclusive control right can manipulate the manipulation object. As for a manipulation object the exclusive control right of which is acquired by a given host, other hosts cannot acquire the exclusive control right before the host which has acquired the exclusive control right releases the exclusive control right. When the host which has acquired the exclusive control right releases the exclusive control right, the manipulation object is set in a state without any exclusive control right, and manipulations of all hosts are permitted.

Upon acquiring the exclusive control right, a host issues a manipulation request of "exclusive control right acquisition". More specifically, a client selects a desired manipulation object from the display window of the 3D space, and issues an acquisition request of the exclusive control right as a manipulation event. The server receives this acquisition request, and notifies respective clients of that request. The client as the issuance source of the acquisition request acquires the exclusive control right of the selected manipulation object and its related objects (data items), as will be described below. All the clients are notified of the acquisition result of the exclusive control right via the server.

Normally, the exclusive control right is independently set for each manipulation object. For this reason, different hosts can acquire the exclusive control rights of respective manipulation objects. For example, in a scene graph shown in FIG. 14, client 1 can acquire the exclusive control right of a manipulation object 1401 and client 2 can acquire that of a manipulation 1402 at the same time.

Since the above method allows to completely independently acquire the exclusive control rights for respective manipulation objects, a problem is often posed when that method is applied to a scene graph having a hierarchical structure. For example, in the scene graph shown in FIG. 13, when host A (not shown) acquires the exclusive control right of the floor 1201, another host B (not shown) can acquire that of the table 1202 and still another host C (not shown) can acquire that of the box 1203. In the scene graph shown in FIG. 13, the table 1202 belongs to the floor 1201, and the box 1203 belongs to the table 1202 and floor 1201. For this reason, when host A that has acquired the exclusive control right of the floor 1201 manipulates the floor 1201, that manipulation often influences the table 1202 and box 1203. However, since host A has acquired the exclusive control right of only the floor 1201, other hosts may manipulate the table 1202 and box 1203, resulting in an unexpected manipulation result.

To avoid such situation, host A must acquire the exclusive control rights of the table 1202 and box 1203 simultaneously with that of the floor 1201. In the above method, host A must independently acquire the exclusive control rights of nodes which are hierarchically related to the node to be manipulated on the basis of the structure of the scene graph. That is, each host must accurately recognize the hierarchical structure of the scene graph to be manipulated, and must then acquire the exclusive control rights of all nodes to be manipulated. This work becomes more complicated with the increasing scale of the scene graph.

In this embodiment, when a given host acquires the exclusive control right of a manipulation object corresponding to an upper node in the scene graph, it also acquires those of manipulation objects corresponding all its lower nodes. More specifically, when a host acquires the exclusive control right of a given manipulation object, it also acquires those of all manipulation objects included in a subtree (sub-scene graph) which has that manipulation object as a root. In the following description, acquiring the exclusive control right of a manipulation object corresponding to a node in the scene graph will be simply expressed as "acquiring the exclusive control right of a node" in this specification. Also, acquiring the exclusive control rights of all manipulation objects included in a sub-scene graph will be simply expressed as "acquiring the exclusive control rights of the sub-scene graph". According to this embodiment, the exclusive control rights of all nodes in a sub-scene graph below the manipulation object are automatically acquired. Hence, a host that wants to manipulate a given object need only hold information of that manipulation object, and need not accurately recognize the structure of the scene graph.

Figure 15:
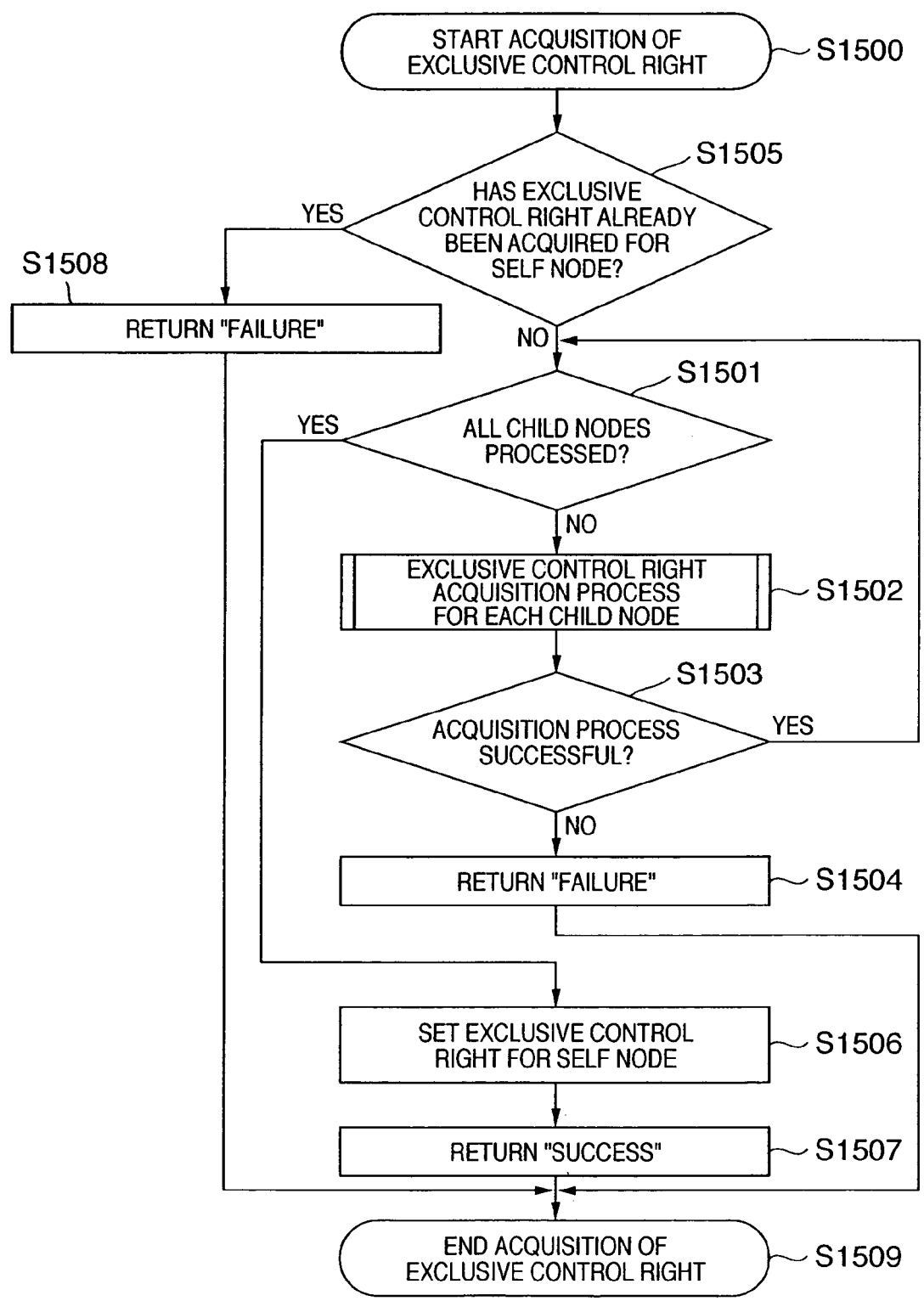
FIG. 15 is a flow chart for explaining the sequence for acquiring the exclusive control right according to the first embodiment.

FIG. 15 shows the flow of the aforementioned process for acquiring the exclusive control right. In step S1500, a process for acquiring the exclusive control right of a designated manipulation object starts. It is confirmed in step S1505 if a host other than the designated host (a client as an acquisition request source of the exclusive control right) has acquired the exclusive control right of a self node (a node to be set with the exclusive control right in the layer of interest). If the exclusive control right has been acquired, the flow jumps to step S1508 to return information indicating "failure" to the call source of the process (a process for a node as an upper layer which is to undergo a recursive process), thus ending this process. If the self node is a node designated by the acquisition request of the exclusive control right from the host, an acquisition failure is returned to that host.

If the exclusive control right is not acquired, the flow advances to step S1501. It is checked in step S1501 if processes for acquiring the exclusive control rights of all child nodes of the self node are complete. If the processes for acquiring the exclusive control rights of all child nodes are complete or no child node is present, the flow jumps to step S1506. Otherwise, the flow advances to step S1502. In step S1502, a process for acquiring the exclusive control right of each child node is executed. This process is recursively done. That is, a given child node is set as an object to be processed, and a new process of acquiring the exclusive control right is called. More specifically, after the processing result obtained so far is saved, the process is interrupted, and a process for the child node set as the object to be processed (the process for that child node set as the self node) newly starts from step S1500.

It is checked in step S1503 if the new process for acquiring the exclusive control right called in step 1502 has succeeded. If that process has succeeded, the flow returns to step S1501 to process the next child node. If the process has failed, the flow advances to step S1504. In step S1504, information indicating "failure" is returned to the call source of the process, and the flow jumps to step S1509.

If it is determined in step S1501 that no child node to be processed is present, the exclusive control right is set for the self node in step S1506, and a host ID of the host that has acquired the exclusive control right is written in the database. In step S1507, information indicating "success" is returned to the call source of the process, and the flow advances to step S1509. On the other hand, in step S1508, information indicating "failure" is returned to the call source of the process, and the flow advances to step S1509. In step S1509, the exclusive control right acquisition process ends. If there is a process that has been interrupted during the recursive call, the interrupted process restarts.

Figure 23:
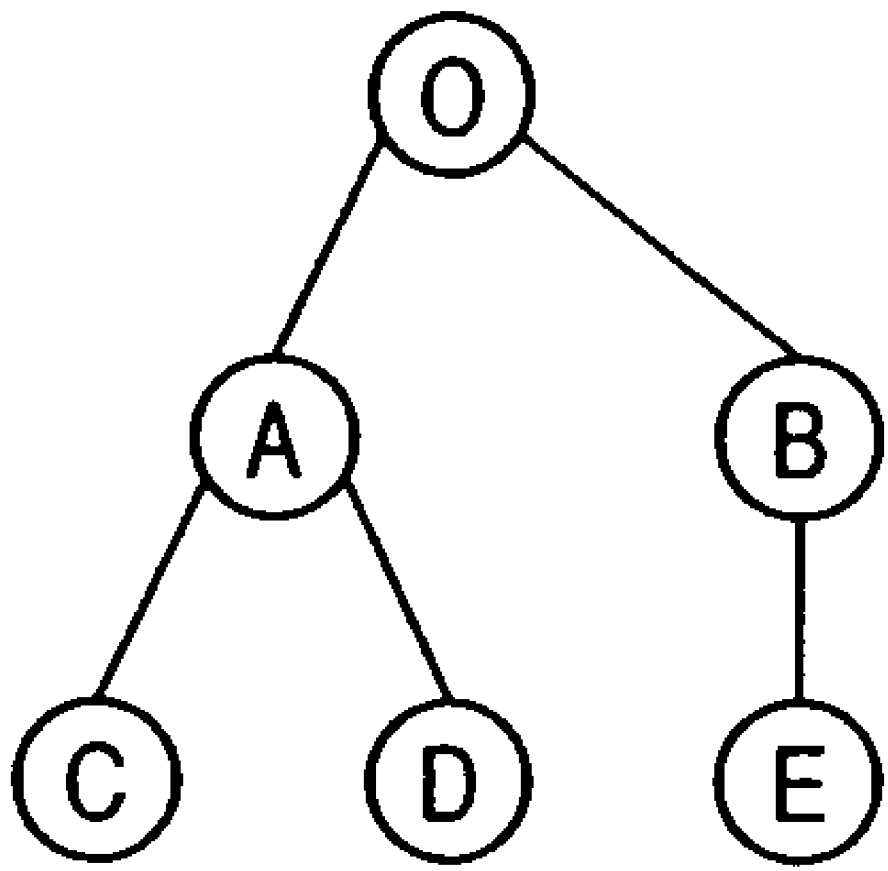
FIG. 23 shows an example of a scene graph that requires a recursive call in the process shown in FIG. 15.

For example, in case of a scene graph shown in FIG. 23, processes are done in the order of O→A→C→D→B →E. When a process for O starts, since child nodes to be processed are present, the flow advances to step S1502 to interrupt the process for O, and a process for A starts from step S1500. Likewise, when the process for A starts, the flow advances to step S1502 to interrupt the process for A, and a process for C starts from step S1500. Since C does not have any child node, if the exclusive control right is not set for C, the process progresses in the order of step S1501→S1506→S1507→S1509, and the process for C has succeeded, thus ending the process. As a result, the process of the call source (the process for A as the upper layer of C) restarts, and the flow returns from step S1503 to step S1501.

Since A has child node D to be processed, the flow advances to step S1502, and the process for D starts from step S1500. If the process for D has succeeded as in C, the process for A restarts. Since the processes for all the child nodes are complete in turn, the flow jumps from step S1501 to step S1506, and the exclusive control right is set for A, thus ending the process. Upon completion of the process for A, the interrupted process for O restarts. However, since O has child node B to be processed, the process is interrupted again, and a process for B starts. In this way, when the setting processes of the exclusive control rights for all nodes O, A, C, D, B, and E have succeeded, the exclusive control right is set for O.

On the other hand, upon releasing the exclusive control right, if a host has acquired the exclusive control right of a given sub-scene graph, it instructs to release the exclusive control right of a node as a root of the sub-scene graph to be released, thus releasing the exclusive control rights of all its lower nodes.

Figure 16:
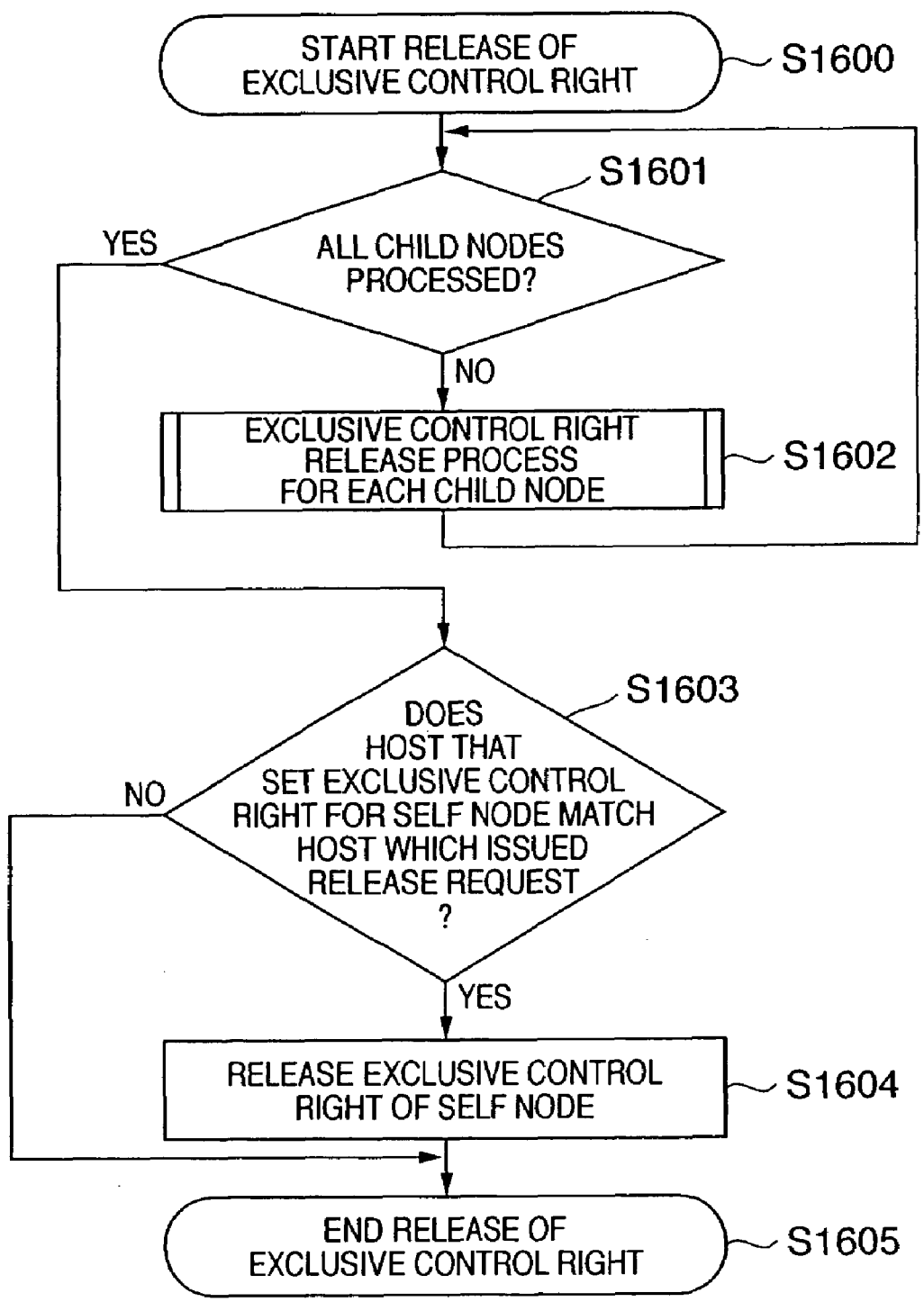
FIG. 16 is a flow chart for explaining the sequence for releasing exclusive control right.

FIG. 16 shows the flow of the process for releasing the exclusive control right. In step S1600, a process for releasing the exclusive control right of a designated manipulation object starts. It is checked in step S1601 if processes for releasing the exclusive control rights of all child nodes of the node of interest are complete. If the processes for releasing the exclusive control rights of all child nodes are complete, or if no child node is present, the flow jumps to step S1603. Otherwise, the flow advances to step S1602.

In step S1602, a process for releasing the exclusive control right of each child node is executed. This process is recursively done. That is, a new process for releasing the exclusive control right is called to have a given child node as an object to be processed. After the processing result obtained so far is saved, the process is interrupted, and a new process for that child node starts from step S1600.

It is confirmed in step S1603 if a host that set the exclusive control right for the self node matches the designated host. Note that only the host that set the exclusive control right for the node of interest can release the exclusive control right in this embodiment. That is, upon setting the exclusive control right, the ID of a host that set the exclusive control right was registered in that node (a data area thereof). Upon releasing the exclusive control right, the held ID is compared with that of a host which calls the release process, and only when the two IDs match, the exclusive control right is released. If no exclusive control right is set or if the host IDs do not match, the flow jumps to step S1605. Otherwise, the flow advances to step S1604.

In step S1604, the exclusive control right set for the self node is released, and the host ID, described in the database, of the host that acquired the exclusive control right is deleted. In step S1605, the exclusive control right release process ends. If there is a process that has been interrupted during the recursive call, the interrupted process restarts.

Figure 17:
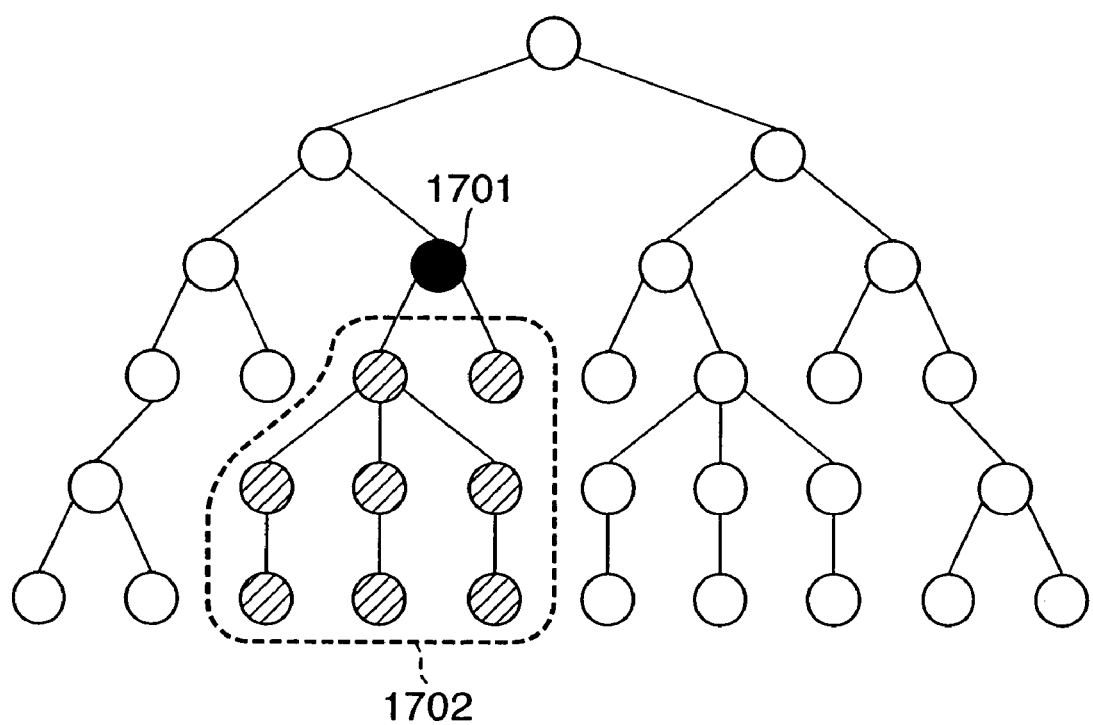
FIG. 17 shows an example wherein the exclusive control right of a sub-scene graph is to be acquired.

For example, in a scene graph in FIG. 17, when the exclusive control right of a black node 1701 is to be acquired, those of lower gray nodes 1702 are acquired at the same time in addition to that of the black node 1701. Likewise, when the exclusive control right of the black node 1701 is released, those of the lower gray nodes (1702) are released at the same time.

When a sub-scene graph which has the manipulation object of interest as a root includes at least one node, the exclusive control right of which cannot be acquired, the exclusive control rights of all nodes in the sub-scene graph cannot be acquired. For example, in a scene graph in FIG. 18, when host A (not shown) wants to acquire the exclusive control right of a node 1801 indicated by a black circle, and host B (not shown) has already acquired the exclusive control rights of nodes indicated by gray squares, host A cannot acquire those of the lower nodes indicated by gray squares. Hence, host A cannot acquire the exclusive control right of the node 1801 indicated by the black circle, either. More specifically, when the exclusive control right of a given node is to be acquired, the exclusive control rights of all nodes in a sub-scene graph which has that node as a root need be able to be acquired. If this condition is not met, the exclusive control right of that node cannot be acquired.

Figure 19:
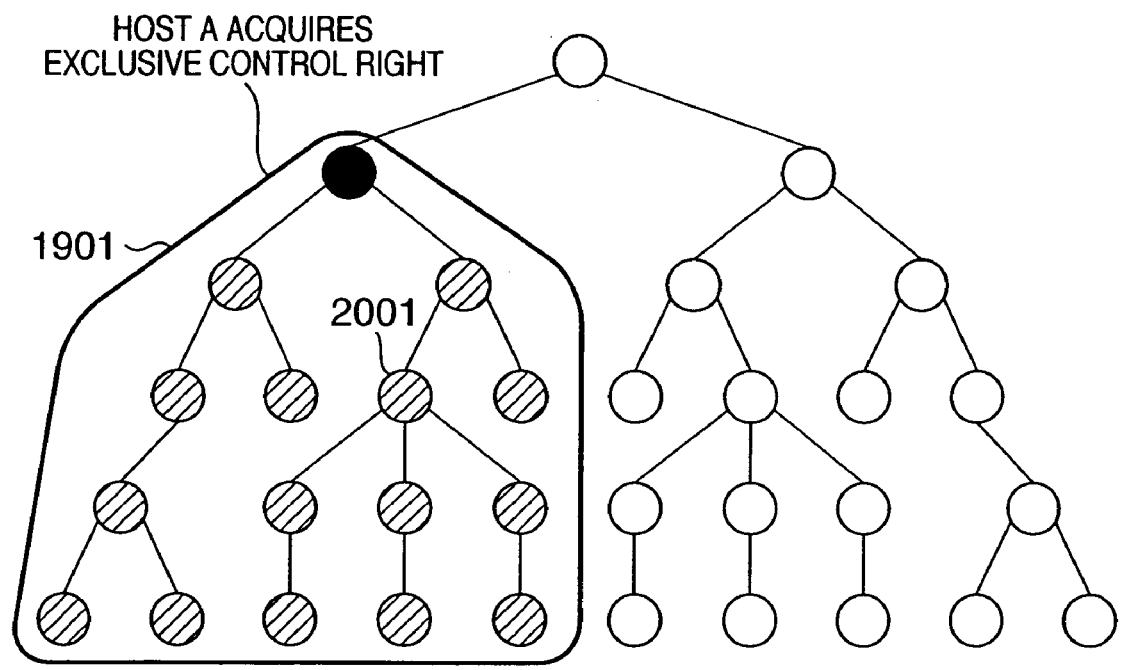
FIG. 19 is a view for explaining acquisition and release of the exclusive control right in a sub-scene graph.
Figure 20:
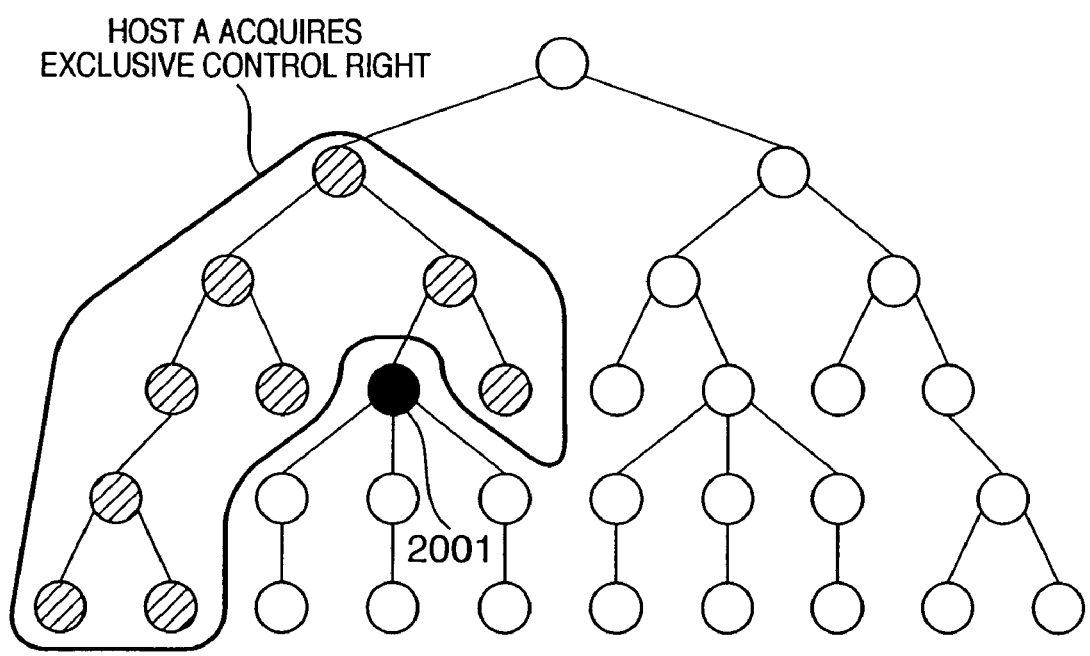
FIG. 20 is a view for explaining acquisition and release of the exclusive control right in a sub-scene graph.

Also, a host can release some exclusive control rights of a sub-scene graph, the exclusive control right of which has been acquired. FIG. 19 shows a state wherein host A (not shown) has acquired the exclusive control right of a sub-scene graph 1901 below a black node. More specifically, host A has acquired the exclusive control rights of black and gray nodes. On the other hand, FIG. 20 shows a state wherein host A releases the exclusive control right of a sub-scene graph below a black node 2001 from the state of FIG. 19. That is, when host A instructs to release the exclusive control right while designating the node 2001 in the state of FIG. 19, the exclusive control right of the sub-scene graph below the node 2001 is released, as shown in FIG. 20.

Figure 21:
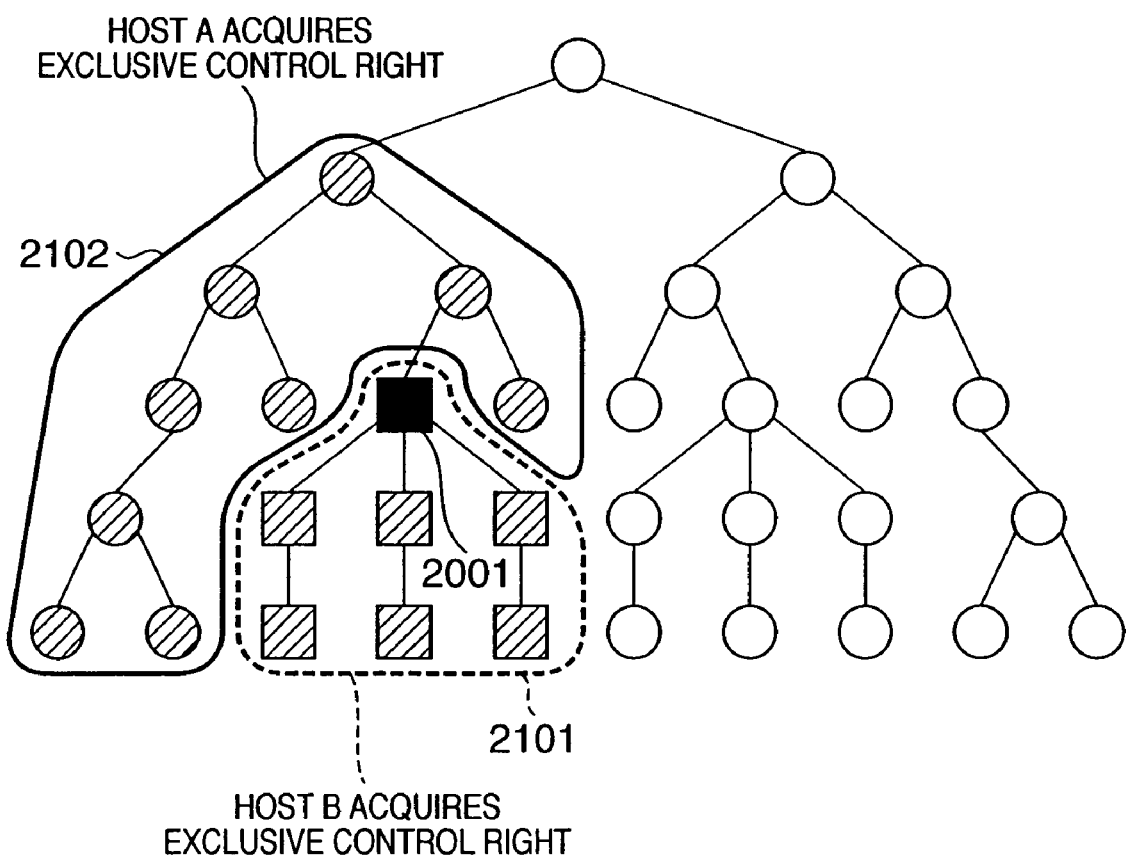
FIG. 21 is a view for explaining acquisition and release of the exclusive control right in a sub-scene graph.

Furthermore, a host can release some exclusive control rights of a sub-scene graph, the exclusive control right of which has been acquired, and another host can acquire the exclusive control right of that portion. FIG. 21 shows a state wherein host B has acquired the exclusive control right of a sub-scene graph 2101 below a node 2001 indicated by a black square from the state shown in FIG. 20. FIG. 21 shows a state wherein host A has acquired the exclusive control rights of nodes 2102 indicated by gray circles, and host B has acquired the exclusive control rights of the nodes 2101 indicated by black and gray squares.

Assume that, for example, host A (not shown) acquires the exclusive control right of the floor 1201 in the scene in FIG. 12. At this time, since the table 1202 and box 1203 form a sub-scene graph of the floor 1201 (FIG. 13), host A acquires the exclusive control rights of the table 1202 and box 1203 at the same time. Next, host A releases the exclusive control right of the table 1202, and host B (not shown) acquires that of the table 1202. At this time, since host A releases the exclusive control right of the box 1203 at the same time, host B acquires those of the table 1202 and box 1203 at the same time. As a result, host A acquires the exclusive control right of the floor 1201, and host B acquires those of the table 1202 and box 1203.

When a sub-scene graph which has a node of interest as a root includes a node, the exclusive control right of which has already been acquired by another host, the exclusive control rights of all nodes in that sub-scene graph can be inhibited from being released. That is, when another host has acquired the exclusive control right of at least one node in the sub-scene graph, a host which has acquired the exclusive control right of its upper node or the sub-scene graph can be inhibited from releasing that of the upper node or sub-scene graph unless the former host releases the exclusive control right of the node of interest.

As described above, in the conventional system, the exclusive control rights of nodes are set independently. Hence, in the conventional system, it is possible to allow a host to manipulate a child node or a sub-scene graph of a node, the exclusive control right of which has been acquired by another host. However, this procedure becomes more complicated than this embodiment. For example, in the above case, host A must independently release the exclusive control rights of the tables 1202 and box 1203, and host B must independently acquire those of the tables 1202 and box 1203 in the conventional system. For this reason, a total number of release and acquisition manipulations of the exclusive control rights is four. On the other hand, in this embodiment, host A need only release the exclusive control right of the table 1202, and host B need only acquire that of the table 1202. Therefore, the total number of release and acquisition manipulations of the exclusive control rights is two. This difference appears more remarkably as the scene graph has a larger scale and the scene graph structure is more complicated.

In the above description, 3D virtual space data are to be shared. However, the contents of the database are not limited to such specific data, and arbitrary data may be shared. Also, the method described in the above embodiment can be applied not only to a case wherein the full contents of the database are to be shared but also to a case wherein only some contents of the database are to be shared. Such features similarly apply to the following embodiments.

As described above, the first embodiment discloses an information processing method for setting an exclusive control right that permits a manipulation from a specific process and denies manipulations from processes other than the specific process for data items in a system in which a plurality of processes connected via an information transmission medium share data, the data include partial data having one or a plurality of hierarchical structures, and each partial data includes one or a plurality of data items. When a target node for which the exclusive control right is to be set is designated, the exclusive control rights of a sub-scene graph below the target node are simultaneously acquired on the basis of the structure of a scene graph of interest. Upon releasing the target node, the exclusive control right of which has been acquired, the exclusive control rights of the sub-scene graph below the target node are simultaneously released on the basis of the structure of the scene graph. For this reason, the acquisition and release processes of the exclusive control rights are facilitated.

Furthermore, according to the first embodiment, some exclusive control rights of a sub-scene graph, the exclusive control right of which has been acquired, can be released, and another process can acquire the released exclusive control rights. In this manner, a flexible exclusive control right setting process can be attained by a simple operation.

Second Embodiment

In the first embodiment, when a sub-scene graph which has a manipulation object as a root includes at least one node, the exclusive control right of which cannot be acquired, the exclusive control rights of all nodes in that sub-scene graph cannot be acquired. In the second embodiment, in such case, the exclusive control right of a node, the exclusive control right of which can be acquired in the sub-scene graph, is acquired.

Figure 22:
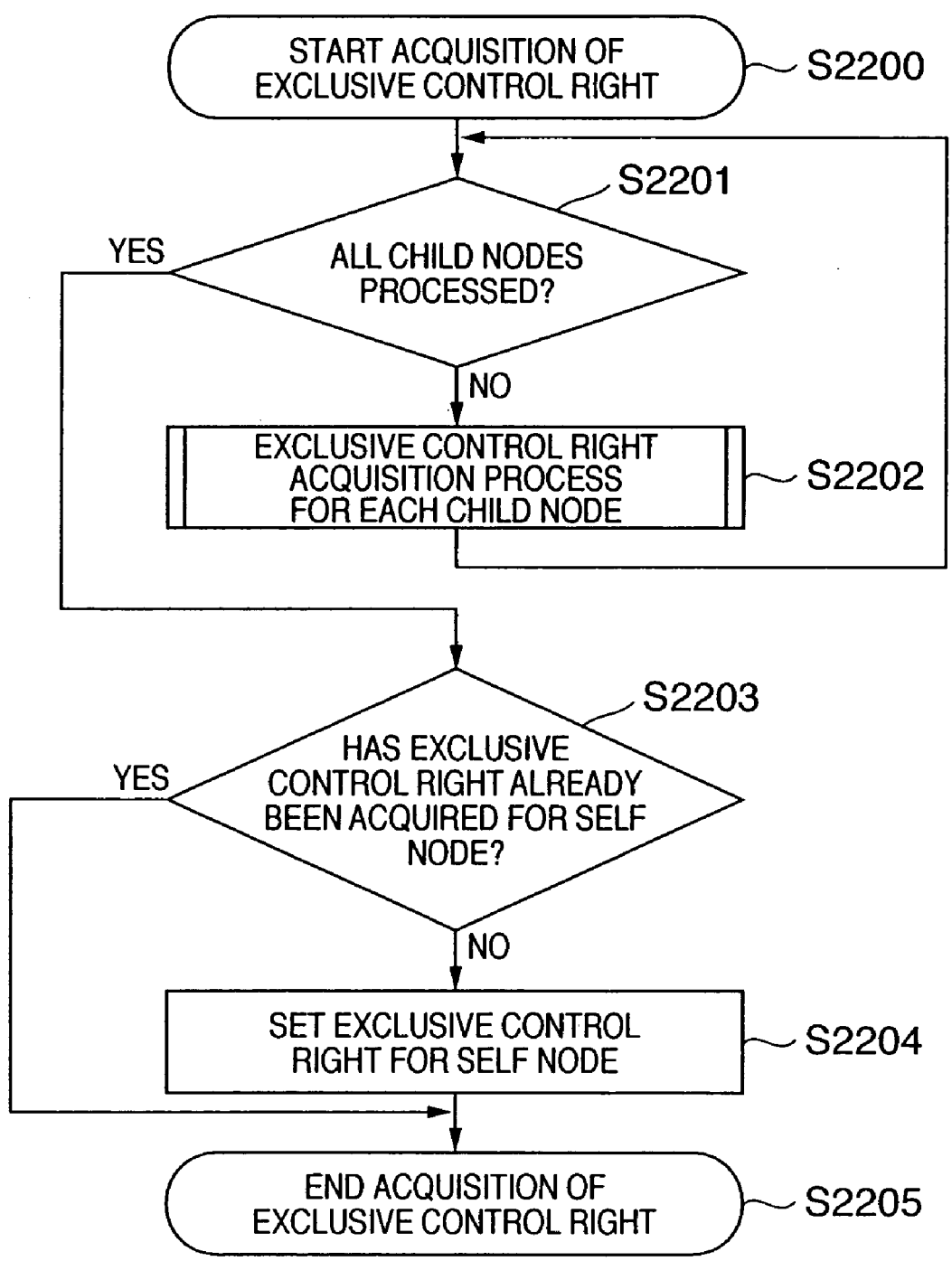
FIG. 22 is a flow chart for explaining the sequence for acquiring the exclusive control right according to the second embodiment.

FIG. 22 shows the flow of the process for acquiring the exclusive control right according to the second embodiment. In step S2200, a process for acquiring the exclusive control right of a designated manipulation object starts. It is checked in step S2201 if processes for acquiring the exclusive control rights of all child nodes of the node of interest are complete. If the processes for acquiring the exclusive control rights of all child nodes are complete or no child node is present, the flow jumps to step S2203. Otherwise, the flow advances to step S2202.

In step S2202, a process for acquiring the exclusive control right of each child node is executed. This process is recursively done. That is, a given child node is set as an object to be processed, and a new process of acquiring the exclusive control right is called. After the processing result obtained so far is saved, the process is interrupted, and a new process for the child node starts from step S2200.

It is confirmed in step S2203 if a host other than the designated host has acquired the exclusive control right of the self node. If the exclusive control right has been acquired, the flow jumps to step S2205; otherwise, the flow advances to step S2204. In step S2204, the exclusive control right is set for the self node, and the host ID of the host that has acquired the exclusive control right is written in the database.

In step S2205, the exclusive control right acquisition process ends. If there is a process that has been interrupted during the recursive call, the interrupted process restarts.

In the second embodiment, after the process for acquiring the exclusive control right of a child node (step S2202), it is not checked if that process has succeeded. That is, even when the child node cannot acquire the exclusive control right, an attempt is made to acquire the exclusive control rights of all nodes of the sub-scene graph without quitting the process. Note that the sequence of the exclusive control right release process in the second embodiment is the same as that in the first embodiment.

As described above, according to the second embodiment, even when a sub-scene graph which has a manipulation object as a root includes at least one node, the exclusive control right of which cannot be acquired, the exclusive control right of only a node, the exclusive control right of which can be acquired in the sub-scene graph, can be acquired.

Other Embodiments

The exclusive control right acquisition process may be launched by selectively using the exclusive control right acquisition methods of the first and second embodiments.

Alternatively, which of the exclusive control right acquisition methods of the first and second embodiments is to be applied may be set in advance for each node, and when the exclusive control right acquisition process is launched, the process may be executed using the acquisition method set for each node.

In the above embodiments, only one host can simultaneously acquire the exclusive control right of a given node. Alternatively, each node may allow a predetermined number of hosts to acquire its exclusive control right. In such case, when a plurality of hosts that have acquired the exclusive control right simultaneously make manipulations, since exclusive control is not executed, an unintended manipulation result may be generated, as described above. However, when only hosts which are guaranteed not to simultaneously manipulate an identical node acquire the exclusive control right, the above problem can be avoided.

As described above, according to the present invention, since the exclusive control right acquisition method based on the virtual space structure is provided, the manipulator can appropriately acquire required exclusive control rights regardless of the virtual space structure.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An information processing method for setting an exclusive control right of a data item by a specific process in a system in which a plurality of processes that can communicate with each other via an information transmission medium share data including a plurality of data items by use of a data structure which has a hierarchy structure having a data item corresponding to an operational object as a root and describes a structural dependence of a virtual space, wherein each of the plurality of data items has type information indicating that the respective data item belongs to a first type in which an exclusive control right is set to the specific process for the data item and all data items belonging to a lower layer of the data item when no exclusive control right is set for the data item and all data items belonging to a lower layer of the item or a second type in which the exclusive control right is set to the specific process for data items for which no exclusive control right is set, of the designated data item and all data items belonging to a lower layer of the data item, and wherein, when the first type is indicated by the type information, an exclusive control right is set to the specific process for the data item and all data items belonging to a lower layer of the data item when no exclusive control right is set for the data item and all data items, and wherein, when the second type is indicated by the type information, the exclusive control right is set to the specific process for data items for which no exclusive control right is set, of the designated data item and all data items belonging to a lower layer of the data item, said method comprising:

a first designation step of designating a data item for which the exclusive control right is to be set;

a retrieval step of retrieving a data item which belongs to a lower layer of the data item designated in said first designation step on the basis of hierarchical structure information of the plurality of data items;

a determination step of determining whether or not an exclusive control right by another process is set, for each data item retrieved in said retrieval step;

a setting step of:

when the designated data item is indicated as the first type by the type information, setting the exclusive control right for the specific process as to the designated data item and as to a retrieved data item retrieved in said retrieval step only if no exclusive control right is set by other process for the designated data item and all of the retrieved data items, and not setting the exclusive control right for the specific process as to all of the designated data items and a retrieved data item in said retrieval step if the exclusive control right is set by another process for at least one of the designated data items and all of the retrieved data items; and when the designated data item is indicated as the second type by the type information, setting the exclusive control right for the specific process as to the designated data item and as to the data items for which it is determined in said determination step that an exclusive control right by another process is not set;

a second designation step of designating a data item for which the exclusive control right is to be released; and a first release step of releasing the exclusive control right of the specific process as to the data item designated in said second designation step and a data item which belongs to a lower layer of the data item designated in said second designation step, while maintaining the exclusive control right of the specific process as to a data item which belongs to an upper layer of the data item designated in said second designation step.

2. A control program stored in a computer-readable storage medium for making a computer execute an information processing method of claim 1.

3. A storage medium storing a control program for making a computer execute an information processing method of claim 1.

4. An information processing apparatus for setting an exclusive control right of a data item by a specific process in a system in which a plurality of processes that can communicate with each other via an information transmission medium share data including a plurality of data items by use of a data structure which has a hierarchy structure having a data item corresponding to an operational object as a root and describes a structural dependence of a virtual space, wherein each of the plurality of said data items has type information indicating that the data item belongs to a first type in which an exclusive control right is set to the specific process for the data item and all data items belonging to a lower layer of the data item when no exclusive control right is set for the data item and all data items belonging to a lower layer of the data item or a second type in which the exclusive control right is set to the specific process for data items for which no exclusive control right is set, of the designated data item and all data items belonging to a lower layer of the data item, and wherein, when the first type is indicated by the type information, an exclusive control right is set to the specific process for the data item and all data items belonging to a lower layer of the data item when no exclusive control right is set for the data item and all data items belonging to a lower layer of the data item, and wherein, when the second type is indicated by the type information, the exclusive control right is set to the specific process for data items for which no exclusive control right is set, of the designated data item and all data items belonging to a lower layer of the data item, said apparatus comprising:

a holding unit for holding hierarchical structure information of the plurality of data items;

a first designation unit for designating a data item for which the exclusive control right is to be set;

a retrieval unit for retrieving a data item which belongs to a lower layer of the data item designated by said first designation unit on the basis of hierarchical structure information of the plurality of data items;

a determination unit for determining whether or not an exclusive control right by another process is set, for each data item retrieved by said retrieval unit;

a setting unit for setting, when the first type is indicated by the type information, the exclusive control right to the specific process for the data item and all data items belonging to a lower layer of the data item when no exclusive control right is set for the data item and all retrieved data items, and, not setting the exclusive control right for the specific process as to the designated item and all of the retrieved data items if the exclusive control right is set by another process for at least one of the designated data items and all of the retrieved data items; and when the second type is indicated by the type information, setting the exclusive control right to the specific process for data items for which no exclusive control right is set, of the designated data item and all data items belonging to a lower layer of the data item;

a second designation unit for designating a data item for which the exclusive control right is to be released; and a first release unit for releasing the exclusive control right of the specific process as to the data item designated by said second designation unit and a data item which belongs to a lower layer of the data item designated by said second designation unit, while maintaining the exclusive control right of the specific process as to a data item which belongs to an upper layer of the data item designated by said second designation unit.

* * * * *